United States Patent
Altenpohl et al.

[15] 3,680,693
[45] Aug. 1, 1972

[54] FLUID CONTROL SYSTEM FOR SELECTOR SCALES

[72] Inventors: William F. Altenpohl; Paul J. Altenpohl, both of Union Hill Rd., West Conshohocken, Pa. 19428

[22] Filed: Oct. 16, 1970

[21] Appl. No.: 81,373

[52] U.S. Cl..................................209/75, 209/121
[51] Int. Cl..............................................B07c 5/16
[58] Field of Search....................209/72, 74, 75, 121

[56] References Cited

UNITED STATES PATENTS

| | | | |
|---|---|---|---|
| 3,289,832 | 12/1966 | Ramsay | 209/75 |
| 3,291,303 | 12/1966 | Altenpohl | 209/121 |

*Primary Examiner*—Richard A. Schacher
*Attorney*—Clarence A. O'Brien and Harvey B. Jacobson

[57] ABSTRACT

Fluid controls actuated by a pair of weighing scales, effect removal of poultry from carriers conveyed along a track, at a release station corresponding to one of the scales through which a lower weight limit is established. The poultry carriers pass initially through a first memory station at which the other scale establishes the upper weight limit. Air jet sensors associated with the scales and a reset device, transmit information to a scale lockout device and a carrier release device.

11 Claims, 6 Drawing Figures

PATENTED AUG 1 1972

William F. Altenpohl
Paul J. Altenpohl
INVENTORS

BY Clarence A. O'Brien
and Harvey B. Jacobson
Attorneys

William F. Altenpohl
Paul J. Altenpohl
INVENTORS

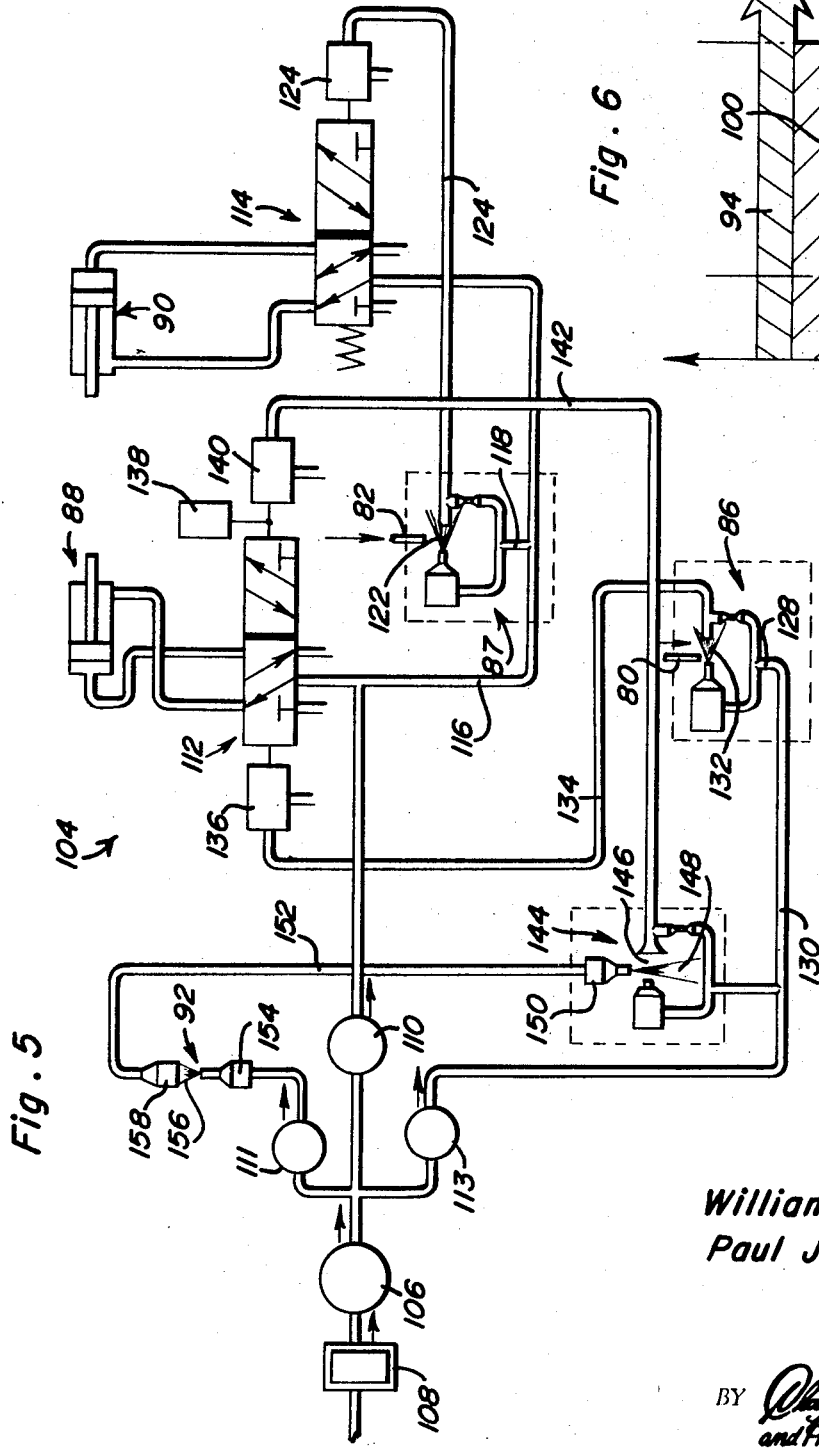
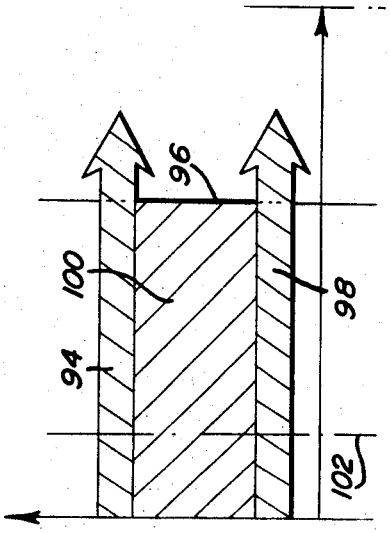
Fig. 5
Fig. 6

FLUID CONTROL SYSTEM FOR SELECTOR SCALES

This invention relates to a fluid control system through which weight sorting information is transmitted. More particularly, the present invention is an improvement over the apparatus disclosed in U.S. Pat. No. 3,291,303 and in application U.S. Ser No. 828,606, filed May 28, 1969, the aforesaid patent and application and the present application being owned in common by the same assignee.

An important consideration in the successful operation of automatic systems for monitoring and selecting moving items such as poultry, is environmental conditions which often cause malfunction of the apparatus and require frequent maintenance and repair services. Such problems are particularly prevalent in a system wherein there are interrelated station controls such as the weight sorting systems disclosed in U.S. Pat. No. 3,291,303 aforementioned. Thus, a damp and moist atmosphere in a poultry processing plant employing such a weight sorting system, would have a deleterious effect on electromechanical controls thereby adversely affecting operational reliability. The corrosive effect of water sprays and constant jarring and vibrations on electro-mechanical apparatus is well known. Accordingly, it is an important object of the present invention to provide a control system that is more reliable in connection with automatic selection such as disclosed in U.S. Pat. No. 3,291,303 aforementioned. Further, it is an additional object of the present invention to provide a fluid control system which is ideally suited for a modular installation such as disclosed in application U.S. Ser. No. 828,606, aforementioned.

In accordance with the present invention, a carrier being conveyed along a track is initially monitored at a first weighing station whereat an upper weight limit is established. Thus, if the weight of the article on the carrier exceeds the upper weight limit, a first scale beam is deflected upwardly thereby actuating a fluid jet type sensor which is operative through valve controls to operate a lockout cylinder device. The lockout cylinder device when operated prevents subsequent monitoring of the moving carrier by a second scale at which a lower weight limit is otherwise established. Thus, articles above the upper weight limit continue to be conveyed past both weight monitoring stations associated with the system of the present invention. Similarly, articles which are below the lower weight limit, will fail to actuate the first scale and the second scale so as to pass both weight monitoring stations. If the weight of the article on the carrier is between the upper and lower weight limits, it will only cause actuation of the second scale which is operative through a second fluid jet type sensor to operate a release cylinder device thereby effecting removal of the article from the carrier as it passes the second weight monitoring station.

Also, movement of the article carrier past the second weight monitoring station, is detected by an air jet sensor to thereby reset the system if the second scale was prevented from being operated by actuation of the lockout cylinder device.

A particularly unique feature of the fluid control system of the present invention resides in the use of an air jet type of reset sensor wherein the article carrier is detected by passage through an air gap across which an air jet is established for supplying a jet of air across a second air gap in a second air jet type of sensor from which a fluid signal is derived for controlling operation of a fluid control valve associated with the lockout cylinder device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a hydraulic circuit diagram corresponding to the system of the present invention; and FIG. 6 is a graphical diagram illustrating the operational characteristics of the system.

Figure 3:
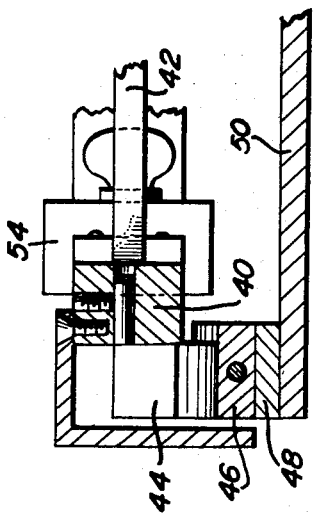
FIG. 3 is an enlarged partial sectional view taken substantially through a plane indicated by section line 3—3 in FIG. 2.
Figure 4:
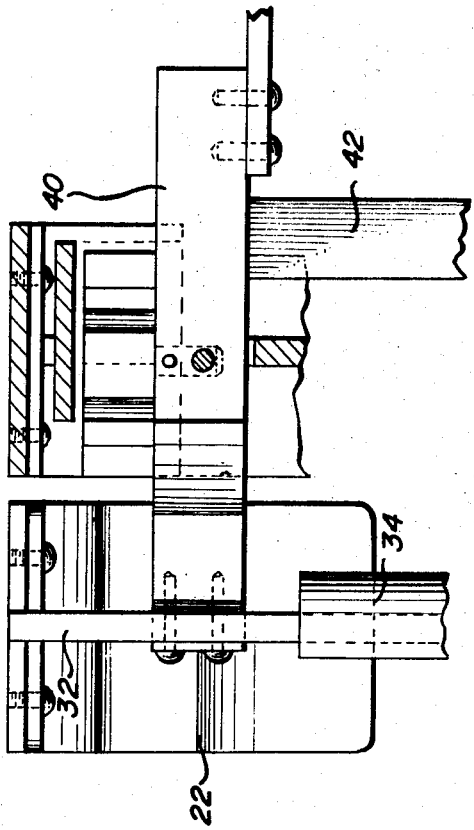
FIG. 4 is an enlarged partial sectional view taken substantially through a plane indicated by section line 4—4 in FIG. 2.
Figure 1:
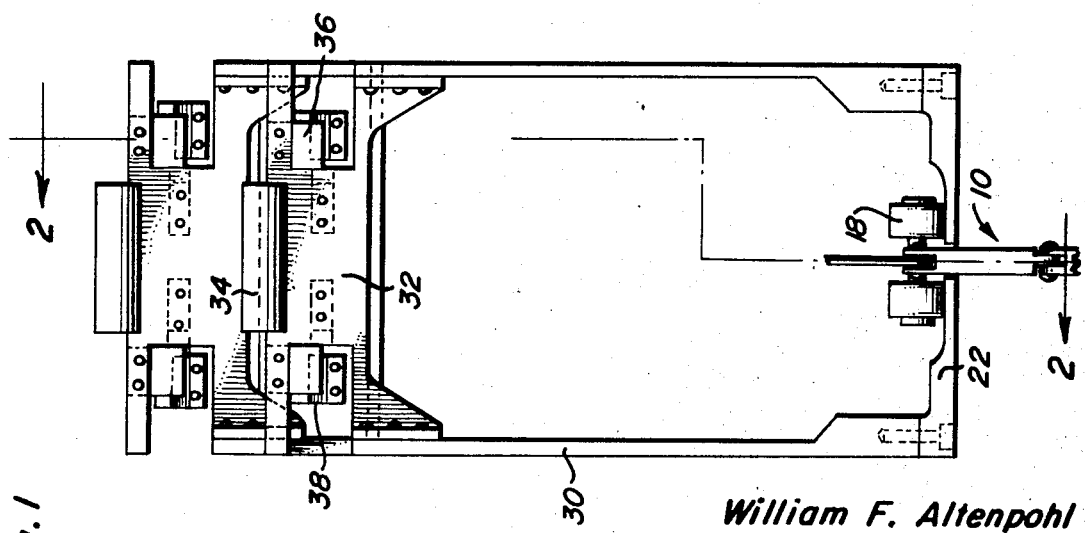
FIG. 1 is a partial front elevational view of the apparatus associated with the system of the present invention.
Figure 2:
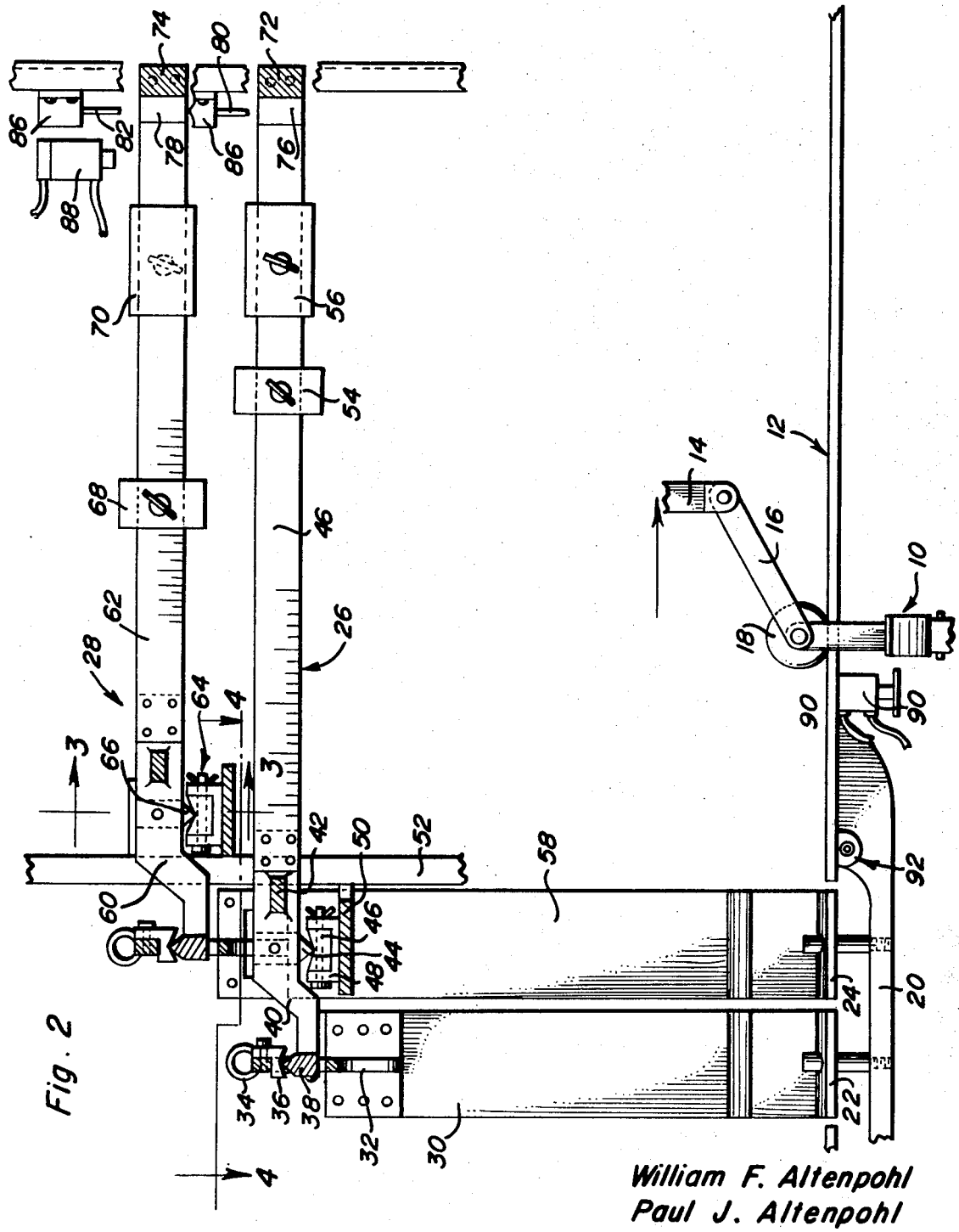
FIG. 2 is a partial side elevational view of the apparatus illustrated in FIG. 1.

FIGS. 1 and 2 illustrate the installational environment for the system of the present invention wherein a poultry carrier generally referred to by reference numeral 10 is conveyed along a stationary track 12, the carrier being suspended from a conveyor chain (not shown) by means of a suspension link 14 pivotally connected at its lower end to a pulling clevis 16. The lower ends of the clevis are pivotally connected to the upper end of the carrier 10 through an axle associated with spaced rollers 18 supported on the track. The track 12 is provided with a gap overlying a jumper 20 so as to accommodate vertically movable track sections 22 and 24 respectively associated with weighing devices 26 and 28. These weighing devices 26 and 28 may be mounted in an installation such as disclosed in application, Ser. No. 828,606, aforementioned.

Each of the weighing devices is similar in construction and arrangement. The weighing device 26, for example, includes a pair of vertical scale brackets 30 to which the movable track sections 22 are connected at the lower ends forming a gap therebetween through which the carrier 10 passes supported by the rollers 18. The brackets 30 are interconnected in vertically spaced relation to the conveyor chain (not shown) by a front plate 32 having a static weight 34 mounted thereon. A pair of pivot bearing members 36 are secured to the front plate in order to pivotally support the brackets 30 and track sections 22 on a pair of front scale pivots 38 secured to the forward ends of a pair of scale body members 40 interconnected by a bar 42. Thus, the load being weighed by the weighing device 26 on the movable track section 22, will be pivotally suspended from the end of the interconnected scale body members on the side of the main scale pivots 44 opposite the sides from which the elongated scale beams 46 extend parallel to the path or track along which the carrier 10 is conveyed. The main scale pivots 44 are supported on fulcrum blocks 46 secured by brackets 48 to the ends of a scale base 50 secured to and projecting from a frame member 52. Weights 54 and 56 are locked in slidably adjusted positions on the scale beams 46 in order to establish an upper weight limit.

The lower weight limit associated with the system of the present invention is established by the second weighing device 28 which includes scale brackets 58 as more clearly seen in FIG. 2 similar to the scale brackets 30 aforementioned except that the brackets 58 are somewhat longer so as to pivotally suspend the scale load from the ends of scale body members 60 to which the somewhat shorter scale beams 62 are connected. Also, a fulcrum assembly 64 is fixedly mounted vertically spaced above and forwardly of the fulcrum assembly associated with the scale unit 26 in order to pivotally support the interconnected scale body and beams of the weighing device 28 by means of its main scale pivots 66. Slidably adjustable weights 68 and 70 establish the lower weight limit monitored by the scale device 28. The scale beams 46 and 62 of each scale unit are interconnected at the ends remote from the fulcrum assemblies by members 72 and 74 and have abutments 76 and 78 secured thereto for actuating a pair of interrupter flag elements 80 and 82 respectively associated with air jet sensors 84 and 86 to be described hereafter.

The weighing device 26 forms, through its movable track section 22, a first monitoring station along the track at which a signal is produced by the sensor 86 in response to upward deflection of the scale beams 46 if the load on the carrier is above an upperweight limit. As a result of the signals so produced, a lockout cylinder device 88 is actuated as shown in FIG. 2 so as to prevent upward pivotal movement of the scale beams of weighing device 28 by an amount necessary to actuate the flag element 82. Therefore, any article conveyed along the track by the carrier 10 above the upper weight limit will pass both weight monitoring stations. If the article being conveyed is below the lower weight limit established by weighing device 28, there will be no actuation of either weighing device 26 or 28 so that the article will also pass both weight monitoring stations in such a situation. Should the weight of the article be between the upper and lower weight limits, it will cause downward movement of the movable track section 24 at the second weight monitoring station and upward displacement of the scale beams 62 to actuate the flag element 82. The sensor 87 will then cause operation of the release cylinder device 90 underlying the track 12 in order to cause release of the article from its carrier after passing the second weight monitoring station.

As the article carrier passes the second weight monitoring station, it is detected by a reset sensor generally referred to by reference numeral 92 which is operative to cause retraction or reset of the lockout cylinder device 88 should it be actuated as aforementioned by the weight of an article passing the first weight monitoring station.

It will be apparent from the foregoing description, that articles having a weight above the upper weight limit as diagrammatically indicated by reference numeral 94 in FIG. 6, will be conveyed beyond the release scale position denoted by reference numeral 96. Also, articles having a weight below the lower limit denoted by reference numeral 98, will pass the release scale position. Only articles denoted by reference numeral 100 lying between the upper and lower weight limits will be removed from the conveyor at the release scale position. It will be noted, that no articles are released at the memory scale position denoted by reference numeral 102 because the weighing device 26 at this position only regulates operation of the system to selectively release articles only at the second release scale position 96.

Referring now to FIG. 5, the control system associated with weighing devices generally denoted by reference numeral 104 utilizes a fluid operating medium such as a pressurized source of air supplied to a main pressure regulator 106 through appropriate filters 108. Air at an operating pressure is accordingly supplied to constant output regulators 110, 111 and 113. The pressurized air from the regulator 110 is conducted through a distributor control valve 112 to one end of the lockout cylinder device 88 for holding the same in a retracted position during the quiescent state of the system as illustrated in FIG. 5. Air under a constant pressure is also supplied through the distributor valve 114 to one end of the release cylinder device 90 to hold the same in a retracted position. The air supply conduit 116 connected to the valves 112 and 114 is also connected to the inlet 118 associated with air jet sensor 87 having an air gap 22 across which a fluid jet of air is conducted to pressure signal line 122. The pressure signal line is connected to an air amplified actuator 124 associated with the distributor valve 114 which is of the single amplified, pressure-piloted, spring return type. It will therefore be apparent that when the flag element 82 is actuated by the weighing device 28, it will displace the valve 114 from the illustrated position to its other operative position against the bias of its spring in order to supply air to the opposite end of the release cylinder device 90 causing extension thereof and release of the article or poultry on the carrier. Accordingly, interruption of the fluid jet in air gap 112 by the flag element 82 will cause release of the article from the conveyor. As soon as the flag element 82 is released, signal pressure is restored in line 124 so that the release device returns to its retracted position in preparation for selective release of a following article.

A similar air jet sensor 86 is associated with the control system and includes an inlet 128 to which the output conduit 130 from the pressure regulator 113 is connected. Thus, when the flag element 80 is actuated by the weighing device 26, jet flow through the air gap 132 is interrupted in order to interrupt signal pressure in the signal line 134 interconnecting the outlet of the jet sensor 86 with one of the pressure amplified actuators 136 associated with the distributor valve 112. Removal of signal pressure from line 134 is operative to cause displacement of the valve 112 so as to supply air under pressure to the opposite side of the lockout device causing extension thereof in order to prevent operation of the weighing device 28 as hereinbefore described. The distributor valve 112 is yieldably held in actuated position by means of a detent 138 and may be restored to initial position by means of a second fluid amplified actuator 140 to which a signal pressure line 142 is connected. The distributor valve 112 is of the double amplified, pressure-piloted, detented type and constitutes part of a fluid operated memory to which information is fed from the sensor 86.

The distributor valve 112 is normally held in its illustrated position by signal pressure in line 134 while a steady state pressure in signal pressure line 142 is applied to the actuator 140. When the distributor valve 112 is in its detented or actuated position as aforementioned, it may be restored to its initial position by a signal applied to the actuator 140 through line 142. This signal is derived from an air jet sensor 144 similar to the air jet sensors 86 and 87 aforementioned except that the fluid jet traversing the air gap 146 is deflected by an air jet flow barrier 148 issuing from a nozzle 150 rather than a solid type interrupter. The nozzle 150 is connected to an air supply conduit 152. Thus, upon removal of the flow barrier 148, an increase in signal pressure in 142 occurs in order to reset the distributor valve 112. The fluid flow barrier 148 is derived from the outlet of pressure regulator 111 connected to a nozzle portion 154 associated with the reset sensor 92. Fluid from the nozzle portion 154 is conducted across the air gap 156 underlying the track adjacent to the second weight monitoring station. The fluid traversing the air gap 156 is received in a receiver portion 158 connected to the conduit 152. Thus, when the article carrier passes through the air gap 156, it interrupts flow to the conduit 152 and temporary removal of the flow barrier 148 producing the reset signal in line 142 clearing or resetting the fluid operated memory valve 112.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a pair of monitoring devices at spaced stations along a path through which articles are conveyed, a control system for removing selected articles from said path having characteristics within a range defined by upper and lower limits respectively established by said monitoring devices, said control system including lockout means for preventing operation of one of said monitoring devices, article release means actuated in response to operation of said one of the monitoring devices, and fluid operated memory means operatively connected to the lockout means for actuation thereof in response to operation of the other of the monitoring devices.

2. The combination of claim 1 including reset means responsive to movement of the articles past one of the spaced stations for clearing the memory means.

3. The combination of claim 2 wherein said memory means includes a source of pressurized fluid, distributor valve means displaceable between two operative positions conducting fluid from said source to the lockout means, jet sensing means responsive to movement of said other of the monitoring devices for effecting displacement of the valve means to one of said operative positions when an article exceeds the upper limit, and means for holding the valve means in said one of the operative positions to maintain the lockout means in an actuated position.

4. The combination of claim 3 wherein said jet sensing means includes nozzle and receiver portions connected to said source establishing a fluid jet within an air gap, and solid interrupter means displaceable by the monitoring device into said air gap.

5. The combination of claim 4 wherein said reset means includes a jet sensor having an air gap through which jet flow of fluid from said source is conducted for resetting the memory means, means connected to the source for establishing a fluid flow barrier in said air gap preventing reset of the memory means, and air gap sensing means for interrupting said flow barrier in response to departure of the articles from said one of the stations.

6. The combination of claim 2 wherein said reset means includes a jet sensor having an air gap through which jet flow of fluid from said source is conducted for resetting the memory means, means connected to the source for establishing a fluid flow barrier in said air gap preventing reset of the memory means, and air gap sensing means for interrupting said flow barrier in response to departure of the articles from said one of the stations.

7. The combination of claim 1 wherein said memory means includes a source of pressurized fluid, distributor valve means displaceable between two operative positions conducting fluid from said source to the lockout means, jet sensing means responsive to movement of said other of the monitoring devices for effecting displacement of the valve means to one of said operative positions when an article exceeds the upper limit, and means for holding the valve means in said one of the operative positions to maintain the lockout means in an actuated position.

8. The combination of claim 7 wherein said jet sensing means includes nozzle and receiver portions connected to said source establishing a fluid jet within an air gap, and solid interrupter means displaceable by the monitoring device into said air gap.

9. The combination of claim 1 wherein each of said monitoring means comprises an article weighing mechanism having an elongated scale beam positioned generally parallel to said path.

10. In combination with a station through which articles are conveyed, means for monitoring the passage of an article through the station including a source of pressurized fluid, a signal control device having an air gap through which jet flow of fluid from the source is conducted, jet deflective means connected to the source for establishing a fluid flow barrier in said air gap, sensing means responsive to the presence of the article at the station for removing said fluid flow barrier, and means for removing selected articles conveyed through the station.

11. The combination of claim 10 wherein said sensing means comprises a nozzle connected to the source from which fluid for the fluid flow barrier is derived, and receiver means spaced by a second air gap from the nozzle conducting the fluid passing through the second air gap to the jet deflective means, said second air gap being positioned in the path of the article.

* * * * *